(12) United States Patent
Obata

(10) Patent No.: US 11,316,985 B2
(45) Date of Patent: Apr. 26, 2022

(54) IMAGE FORMING APPARATUS FOR DETERMINING WHETHER A DOOR SENSOR OR AN INTERRUPT VOLTAGE SWITCH HAS FAILED

(71) Applicant: CANON KABUSHIKI KAISHA, Tokyo (JP)

(72) Inventor: Shuji Obata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/165,183

(22) Filed: Feb. 2, 2021

(65) Prior Publication Data
US 2021/0243311 A1    Aug. 5, 2021

(30) Foreign Application Priority Data
Feb. 5, 2020  (JP) .............................. JP2020-017897

(51) Int. Cl.
*H04N 1/00*    (2006.01)

(52) U.S. Cl.
CPC ..... *H04N 1/00037* (2013.01); *H04N 1/00015* (2013.01); *H04N 1/00074* (2013.01); *H04N 1/00925* (2013.01)

(58) Field of Classification Search
CPC .......... H04N 1/00037; H04N 1/00015; H04N 1/00074; H04N 1/00925
See application file for complete search history.

(56) References Cited

U.S. PATENT DOCUMENTS

| 2014/0003825 A1* | 1/2014 | Yamaguchi | G03G 15/55 399/9 |
| 2015/0212476 A1* | 7/2015 | Ishii | G03G 15/80 307/140 |
| 2019/0278652 A1* | 9/2019 | Yamaguchi | G06K 15/408 |

FOREIGN PATENT DOCUMENTS

JP        2009198708 A      9/2009

* cited by examiner

*Primary Examiner* — Benjamin O Dulaney
(74) *Attorney, Agent, or Firm* — Rossi, Kimms & McDowell LLP

(57) ABSTRACT

An image forming apparatus includes: an image forming unit configured to form an image; a transfer circuit configured to generate a transfer voltage, and supply the transfer voltage to transfer roller for transferring the image onto a sheet; a door provided to a mounting portion onto which the image forming unit is mounted; a sensor configured to detect an open/closed state of the door; an interlock switch configured to interrupt voltage to be supplied to the transfer circuit, in a case where the sensor detects an open state in which the door is opened; and a controller configured to: determine whether a failure has occurred or not based on a detection result of the sensor and a supplying/interrupting state of the voltage of the interlock switch; and determine, in a case where determining that the failure has occurred, which of the sensor and the interlock switch is failed.

8 Claims, 12 Drawing Sheets

| RIGHT DOOR | IL SW | RIGHT DOOR SW |
|---|---|---|
| OPENED | POWER INTERRUPTING STATE | RIGHT DOOR OPENING DETECTING STATE |
| CLOSED | POWER SUPPLYING STATE | RIGHT DOOR CLOSING DETECTING STATE |

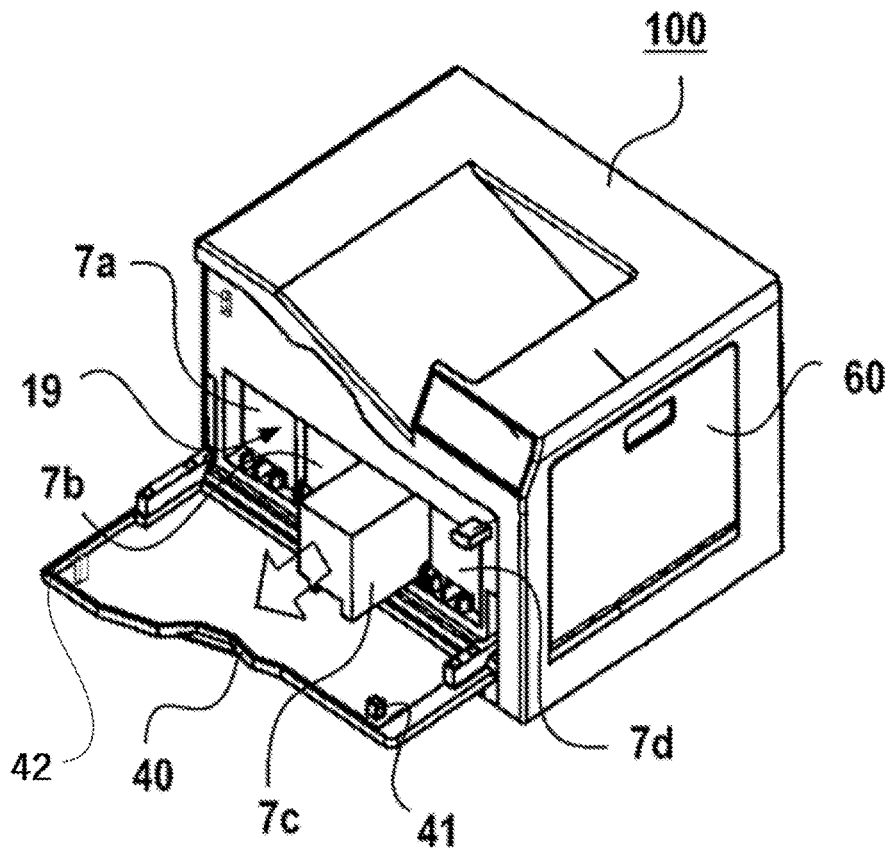

FIG. 8

| RIGHT DOOR | FRONT DOOR | IL SW | FRONT DOOR SW | RIGHT DOOR SW |
|---|---|---|---|---|
| OPENED | OPENED | POWER INTERRUPTING STATE | FRONT DOOR OPENING DETECTING STATE | RIGHT DOOR OPENING DETECTING STATE |
| | CLOSED | POWER INTERRUPTING STATE | FRONT DOOR CLOSING DETECTING STATE | RIGHT DOOR OPENING DETECTING STATE |
| CLOSED | OPENED | POWER INTERRUPTING STATE | FRONT DOOR OPENING DETECTING STATE | RIGHT DOOR CLOSING DETECTING STATE |
| | CLOSED | POWER SUPPLYING STATE | FRONT DOOR CLOSING DETECTING STATE | RIGHT DOOR CLOSING DETECTING STATE |

FIG. 9

IMAGE FORMING APPARATUS FOR DETERMINING WHETHER A DOOR SENSOR OR AN INTERRUPT VOLTAGE SWITCH HAS FAILED

BACKGROUND OF THE INVENTION

Field of the Invention

The present disclosure relates to a technology of specifying, in a case where an image forming apparatus such as a copying machine, a printer, or a facsimile machine has an abnormality in operation, a failure location causing the abnormality.

Description of the Related Art

In an image forming apparatus, a user or a serviceman accesses an inside of the apparatus at a time of jam clearance work, maintenance work, or work of replacing consumable supplies. In Japanese Patent Application Laid-open No. 2009-198708, in order to secure an opening for accessing the inside of the apparatus, there is disclosed an image forming apparatus including an openable/closable door at the opening. The user or the serviceman can open the door to easily access the inside of the image forming apparatus and perform work. In a case where a plurality of doors for accessing the inside of the image forming apparatus are provided and any one of the doors is opened, the image forming apparatus causes an interlock device to interrupt supply of power to a load such as a high-voltage unit or a motor for safety, to thereby inhibit an operation of the image forming apparatus. In order for the image forming apparatus to perform a normal operation, all of the doors are required to be normally closed. Therefore, in general, the image forming apparatus includes an opening/closing detection device configured to detect opening/closing of the door, and determines whether or not to allow the operation based on a detection result of the opening/closing detection device.

In a case where the interlock device is failed under a state in which the power to the load is interrupted, no power is supplied in the image forming apparatus, and hence the image forming apparatus cannot operate normally even when all of the doors are normally closed. In this case, the image forming apparatus cannot notify the user of the occurrence of the abnormality of the interlock device because no power is supplied therein, and the image forming apparatus may be left in the abnormal state until the user notices the abnormality. Further, even when the user who noticed the abnormality contacts the serviceman so that restoration work is performed, it is difficult for the serviceman to easily determine the failure of the interlock device. Therefore, a long time is spent for the restoration.

The image forming apparatus is capable of monitoring the state of the interlock device by a central processing unit (CPU) or the like. In any one of a case in which the interrupting state of the interlock device is detected and a case in which the opening of the door is detected by the opening/closing detection device, the image forming apparatus gives a notification of the opening of the door. Even when the interlock device is failed in the power interrupting state, or even when the opening/closing detection device is failed to erroneously detect the opening of the door, the notification of the opening of the door is given. In such cases, the serviceman cannot immediately determine which of the interlock device and the opening/closing detection device is failed, and a long time is spent for the restoration work.

As described above, determination of the occurrence of the failure itself is difficult for the image forming apparatus which has stopped to operate normally because any one of the opening/closing detection device and the interlock device is failed. Further, even after the occurrence of the failure is found, the determination of the failure location is difficult. Therefore, the recovery for the failure and the restoration work of the apparatus are delayed. The present disclosure has been made in view of the above-mentioned problems, and has a primary object to provide an image forming apparatus capable of specifying early which of an interlock device and an opening/closing detection device is failed.

SUMMARY OF THE INVENTION

An image forming apparatus according to the present disclosure includes: an image forming unit configured to form an image; a transfer circuit configured to generate a transfer voltage, and supply the transfer voltage to transfer roller for transferring the image onto a sheet; a door provided to a mounting portion onto which the image forming unit is mounted; a sensor configured to detect an open/closed state of the door; an interlock switch configured to interrupt voltage to be supplied to the transfer circuit, in a case where the sensor detects an open state in which the door is opened; and a controller configured to: determine whether a failure has occurred or not based on a detection result of the sensor and a supplying/interrupting state of the voltage of the interlock switch; and determine, in a case where determining that the failure has occurred, which of the sensor and the interlock switch is failed based on a change in the detection result of the sensor and a change in a supplying state of the voltage of the interlock switch, which are caused by an opening/closing operation of the door performed after the occurrence of the failure is determined.

Further features of the present invention will become apparent from the following description of exemplary embodiments (with reference to the attached drawings).

BRIEF DESCRIPTION OF THE DRAWINGS

FIG. 8 is a perspective view for illustrating a state in which a front door of the image forming apparatus is opened.

FIG. 9 is an explanatory table for showing relationships among open/closed states of the right door and the front door and states of the right door SW, a front door SW, and the IL SW.

DESCRIPTION OF THE EMBODIMENTS

Now, embodiments of the present disclosure are described with reference to the drawings.
<Configuration of Image Forming Apparatus>

Figure 1:
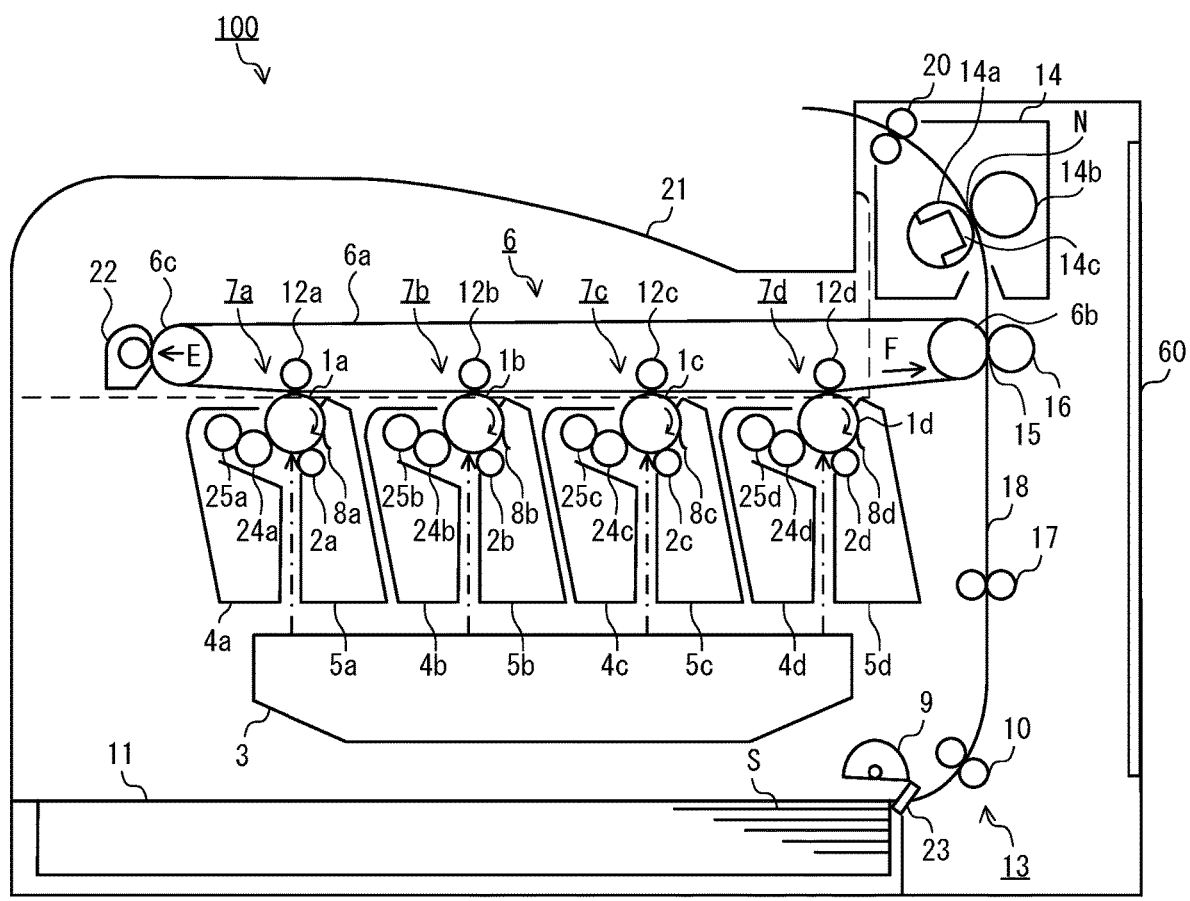
FIG. 1 is a configuration view for illustrating an image forming apparatus.

FIG. 1 is a configuration view for illustrating an image forming apparatus according to an embodiment of the present disclosure. An image forming apparatus 100 includes a plurality of image forming units 7a, 7b, 7c, and 7d, an intermediate transfer belt unit 6, an exposing device 3, a sheet feeding unit 13, a fixing device 14, and a right door 60. Details of the right door 60 are described later. The four image forming units 7a, 7b, 7c, and 7d in this embodiment are configured to form images of different colors. The image forming unit 7a is used to form a yellow image. The image forming unit 7b is used to form a magenta image. The image forming unit 7c is used to form a cyan image. The image forming unit 7d is used to form a black image. The four image forming units 7a, 7b, 7c, and 7d have the same configuration. Suffixes "a", "b", "c", and "d" of the reference symbols correspond to yellow, magenta, cyan, and black, respectively. In the following, unless colors are required to be distinguished, the suffixes "a", "b", "c", and "d" of the reference symbols are omitted.

Each image forming unit 7 includes a developing device 4, and a cleaner unit 5 including a photosensitive drum 1. Each image forming unit 7 is formed as an integral cartridge to be removably mounted to a casing of the image forming apparatus 100. The developing device 4 includes a toner container, a developing roller 24, and a developer supplying roller 25. The toner container contains developer (toner) of a corresponding color. The developing roller 24 is provided to be adjacent to a surface of the photosensitive drum 1. The developing roller 24 is driven to rotate by a drive unit (not shown), and is applied with a developing bias voltage by a developing bias power supply (not shown), to thereby perform developing processing. The developer supplying roller 25 supplies toner to the developing roller 24 from the toner container. The cleaner unit 5 includes, in addition to the photosensitive drum 1, a charging roller 2, a drum cleaning blade 8, and a waste toner container (not shown).

The photosensitive drum 1 is a drum-shaped image bearing member formed by applying an organic photo conductor (OPC) layer onto an outer peripheral surface of an aluminum cylinder. The photosensitive drum 1 is freely-rotatably supported at both end portions of a drum shaft by flanges. In a case where a driving force is transmitted from a drive motor (not shown) to one of the end portions, the photosensitive drum 1 is driven to rotate in a clockwise direction as indicated by the arrows.

The charging roller 2 is a conductive roller. The charging roller 2 is brought into abutment against the surface of the photosensitive drum 1, and is applied with a charging bias voltage by a power supply (not shown), to thereby uniformly charge the surface of the photosensitive drum 1 coated with the OPC.

On the photosensitive drum 1 having a uniformly charged surface, an electrostatic latent image is formed by a laser beam radiated from the exposing device 3. The exposing device 3 is arranged vertically below the image forming units 7a, 7b, 7c, and 7d, and radiates the laser beam to the photosensitive drum 1 based on an image signal. The photosensitive drum 1 is charged by the charging roller 2 to have a predetermined negative potential, and then the laser beam is radiated thereto. Thus, an electrostatic latent image corresponding to the image signal is formed.

The developing device 4 causes toner to adhere to the electrostatic latent image to form a toner image on the photosensitive drum 1. The developing device 4 causes negative toner to adhere to the electrostatic latent image from the developing roller 24 to reversely develop the electrostatic latent image. The developing device 4a uses yellow toner to form a yellow toner image on the photosensitive drum 1a. The developing device 4b uses magenta toner to form a magenta toner image on the photosensitive drum 1b. The developing device 4c uses cyan toner to form a cyan toner image on the photosensitive drum 1c. The developing device 4d uses black toner to form a black toner image on the photosensitive drum 1d.

The drum cleaning blade 8 removes the toner remaining on the surface of the photosensitive drum 1 after the toner image is transferred from the photosensitive drum 1 onto an intermediate transfer belt 6a to be described later. The removed toner is collected through a waste toner conveyance path (not shown) to the waste toner container (not shown) arranged at an apparatus depth portion.

The intermediate transfer belt unit 6 includes the intermediate transfer belt 6a, primary transfer rollers 12, and a transfer belt cleaner 22. The primary transfer rollers 12a, 12b, 12c, and 12d are provided so as to correspond to the photosensitive drums 1a, 1b, 1c, and 1d, respectively. Each primary transfer roller 12 is arranged so as to be opposed to the corresponding photosensitive drum 1 across the intermediate transfer belt 6a. Each primary transfer roller 12 is applied with a positive transfer bias voltage from a power supply (not shown) to transfer the toner image from the photosensitive drum 1 onto the intermediate transfer belt 6a. The intermediate transfer belt 6a is stretched by a drive roller 6b and a tension roller 6c. The tension roller 6c tensions the intermediate transfer belt 6a in an arrow E direction. The drive roller 6b is rotated by a drive motor (not shown) to rotate the intermediate transfer belt 6 in an arrow F direction. The toner images are sequentially transferred from the photosensitive drums 1a, 1b, 1c, and 1d in a superimposing manner at timings synchronizing with the rotation of the intermediate transfer belt 6, and thus a full-color toner image is formed on the intermediate transfer belt 6.

A secondary transfer roller 16 is arranged at a position opposed to the drive roller 6b across the intermediate transfer belt 6a. The drive roller 6b and the secondary transfer roller 16 form a secondary transfer portion 15. The toner image formed on the intermediate transfer belt 6 is conveyed to the secondary transfer portion 15 through rotation of the intermediate transfer belt 6.

The sheet feeding unit 13 includes a feeding cassette 11 and a conveyance path 18. The feeding cassette 11 stores sheets S. The conveyance path 18 is a path for conveying the sheets S fed from the feeding cassette 11 to a discharge tray 21. The conveyance path 18 has various rollers provided thereto to feed the sheets S. In the middle of the conveyance path 18, the secondary transfer portion 15 and the fixing device 14 are provided.

The feeding cassette 11 can be pulled out from the casing of the image forming apparatus 100. A user pulls out the feeding cassette 11 from the casing of the image forming apparatus 100 to store the sheets S, and then inserts the feeding cassette 11 into the casing of the image forming apparatus 100 to replenish the sheets S.

The sheets S stored in the feeding cassette 11 are fed one by one by a feeding roller 9 and a separation pad 23 from the feeding cassette 11 to the conveyance path 18. The feeding roller 9 picks up the sheets S stored in the feeding cassette 11. The separation pad 23 separates the sheets S picked up by the feeding roller 9 into each sheet by a friction piece separation method. The fed sheet S is conveyed by a conveyance roller pair 10 through the conveyance path 18 to a registration roller pair 17. The registration roller pair 17 is stopped at a timing at which the conveyed sheet S arrives. Therefore, a leading edge side of the sheet S in a conveyance direction collides with the registration roller pair 17. Even after the collision, the conveyance roller pair 10 continues the conveyance of the sheet S so that the sheet S warps in a predetermined amount on the leading edge side. In this manner, the skew feed of the sheet S with respect to the conveyance direction is corrected. The registration roller pair 17 starts rotating in synchronization with the timing at which the toner image formed on the intermediate transfer belt 6a is conveyed to the secondary transfer portion 15, and conveys the sheet S subjected to skew feed correction to the secondary transfer portion 15.

The secondary transfer portion 15 transfers the toner image formed on the intermediate transfer belt 6a onto the sheet S. In a case where a positive bias voltage is applied to the secondary transfer roller 16, the secondary transfer portion 15 transfers the toner image formed on the intermediate transfer belt 6a onto the conveyed sheet S. Through the rotation of the secondary transfer roller 16, the sheet S having the toner image transferred thereon is conveyed to the fixing device 14. The toner remaining on the intermediate transfer belt 6a after the transfer is removed by the transfer belt cleaner 22. The transfer belt cleaner 22 collects the removed toner to the above-mentioned waste toner container.

The fixing device 14 applies heat and pressure to the toner image transferred onto the sheet S to fix the toner image to the sheet S. The fixing device 14 includes a cylindrical fixing belt 14a and an elastic pressure roller 14b. The fixing belt 14a includes a belt guide member 14c having a heater or other heat generating members bonded thereto, and is guided by the belt guide member 14c. The elastic pressure roller 14b sandwiches the fixing belt 14a between the elastic pressure roller 14b and the belt guide member 14c to form a fixing nip portion N having a predetermined width at a predetermined pressure-contact force.

The elastic pressure roller 14b is driven to rotate by a drive unit (not shown). The fixing belt 14a is rotated in association with the rotation of the elastic pressure roller 14b. The fixing belt 14a is heated by the heat generating member. Under a state in which the temperature of the fixing nip portion N is raised and adjusted to a predetermined temperature by the heat generating member, the sheet S having an unfixed toner image formed thereon is introduced between the fixing belt 14a and the elastic pressure roller 14b at the fixing nip portion N. The sheet S is introduced to the fixing nip portion N with its surface having the toner image formed thereon being directed to the fixing belt 14a side. The surface of the sheet S having the toner image formed thereon is brought into close contact with an outer surface of the fixing belt 14a, and the sheet S is nipped and conveyed through the fixing nip portion N together with the fixing belt 14a. In a process of being nipped and conveyed through the fixing nip portion N together with the fixing belt 14a, the toner image transferred on the sheet S is heated and fixed to the sheet S by the heat generating member in the fixing belt 14a. The sheet S having the toner image fixed thereto is conveyed from the fixing device 14 to a discharge roller pair 20. The discharge roller pair 20 discharges the sheet S to the discharge tray 21.

First Embodiment

Figure 2:
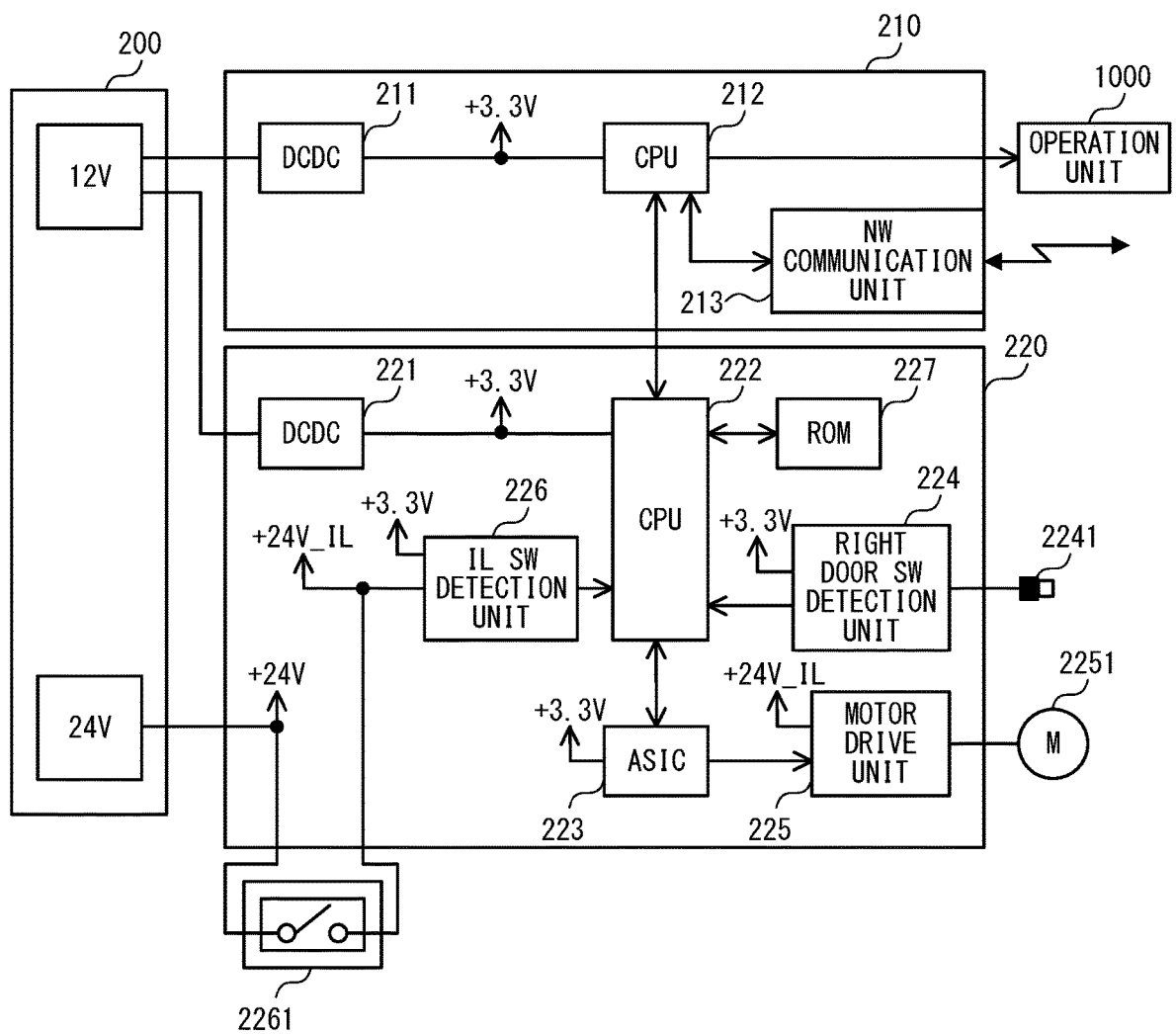
FIG. 2 is a configuration diagram of a control system in a first embodiment of the present disclosure.

FIG. 2 is a configuration diagram of a control system in a first embodiment of the present disclosure, which is configured to control the operation of the image forming apparatus 100. The control system includes a power supply board 200, a controller board 210, and an engine control board 220.

The power supply board 200 generates two types of power supply voltages. In this embodiment, two types of DC power supply voltages of 12 V and 24 V are generated. The power supply voltage of 12 V is referred to as "12-V power supply voltage," and the power supply voltage of 24 V is referred to as "24-V power supply voltage." The 12-V power supply voltage is supplied to the controller board 210 and the engine control board 220. The 24-V power supply voltage is supplied to the engine control board 220.

The controller board 210 includes a DC-DC conversion unit 211, a CPU 212, and an NW communication unit 213. The controller board 210 is connected to an operation unit 1000. The DC-DC conversion unit 211 converts the 12-V power supply voltage supplied from the power supply board 200 to generate an internal voltage to be used for operations of the CPU 212 and the engine control board 220. In this embodiment, the DC-DC conversion unit 211 converts the 12-V power supply voltage to generate the internal voltage of +3.3 V. The CPU 212 executes a predetermined computer program to control the operation of the entire image forming apparatus 100. The CPU 212 uses the NW communication unit 213 being a communication interface to communicate to/from an external apparatus via a local area network or other networks. Further, the CPU 212 receives an instruction or the like from the user through the operation unit 1000, and gives a notification of information to the user.

The operation unit 1000 is a user interface including an input interface and an output interface. Examples of the input interface include various buttons and a touch panel. Examples of the output interface include a display and a speaker. Information input through the input interface is transmitted to the CPU 212. The output interface is controlled by the CPU 212 to perform screen display or sound output.

The engine control board 220 performs, in accordance with the control of the CPU 212 of the controller board 210, drive control of the image forming unit 7, drive control of the intermediate transfer belt unit 6, drive control of the fixing device 14, and drive control of a load, for example, a motor, which is configured to rotate each roller for conveying the sheet, for example. The engine control board 220 in this embodiment is connected to a motor 2251, a right door switch (SW) 2241, and an interlock switch (IL SW) 2261.

The motor 2251 serves as the load. The right door SW 2241 is configured to detect an open/closed state of the right door 60 provided to the casing of the image forming apparatus 100. The 24-V power supply voltage supplied from the power supply board 200 to the engine control board 220 passes through the IL SW 2261 to be returned to the engine control board 220 as a+24V_IL voltage. The +24V_IL voltage is used for the operation of the load (for example, the motor 2251) of the image forming apparatus 100. In the IL SW 2261, the output (supplying/interrupting state) of the +24V_IL voltage (power) is controlled in accordance with the open/closed state of the right door 60. In FIG. 2, the IL SW 2261 is formed of one switch, but the IL SW 2261 may be formed by connecting two interlocking switches in series.

The engine control board 220 includes a DC-DC conversion unit 221, a CPU 222, an ASIC 223, a right door SW detection unit 224, a motor drive unit 225, an IL SW detection unit 226, and a read only memory (ROM) 227. The CPU 222 is connected to the CPU 212 of the controller board 210 so as to allow communication therebetween. The CPU 222 is connected to the DC-DC conversion unit 221, the ASIC 223, the right door SW detection unit 224, the motor drive unit 225, the IL SW detection unit 226, and the ROM 227 so as to allow communication therebetween.

The DC-DC conversion unit 221 converts the 12-V power supply voltage supplied from the power supply board 200 to generate an internal voltage to be used for the operations of the CPU 222 and the engine control board 220. In this embodiment, the DC-DC conversion unit 221 converts the 12-V power supply voltage to generate the internal voltage of +3.3 V.

The CPU 222 executes a computer program stored in the ROM 227 to control the operation of the engine control board 220 in cooperation with the CPU 212 of the controller board 210. The CPU 222 determines the supplying state of the +24V_IL voltage via the IL SW detection unit 226. The IL SW detection unit 226 converts the voltage value of the +24V_IL voltage into a voltage within a rated range of the CPU 222 to input the obtained voltage to an analog port of the CPU 222. The CPU 222 determines the supplying state of the +24V_IL voltage based on the +24V_IL voltage obtained after the conversion. Alternatively, the CPU 222 may acquire, at a digital port, a digital signal (power supply detection signal) obtained by converting the +24V_IL voltage by a transistor or the like, to thereby determine the supplying state of the +24V_L voltage based on the power supply detection signal.

The CPU 222 monitors the state of the right door SW 2241 via the right door SW detection unit 224. Details are described later, but the right door SW 2241 is a sensor to be pressed by a protrusion provided to the right door in a case where the right door 60 is closed. In a case where the right door SW detection unit 224 detects that the right door SW 2241 is pressed, the right door SW detection unit 224 notifies the CPU 222 of the closed state of the right door 60. In a case where the right door 60 is opened, the right door SW 2241 is no longer pressed by the protrusion provided to the right door 60. In a case where the right door SW detection unit 224 detects that the right door SW 2241 is no longer pressed, the right door SW detection unit 224 notifies the CPU 222 of the open state of the right door 60.

The CPU 222 causes the ASIC 223 to control the motor drive unit 225 to perform the drive control of the motor 2251. The ASIC 223 is an application specific integrated circuit for driving a motor. The CPU 222 controls the ASIC to control the timing to drive the motor 2251 or the like. Further, the CPU 222 monitors a state of a signal input to the ASIC 223.

In the above-mentioned configuration, the control system acquires a print instruction via the operation unit 1000 or the network. The print instruction is input to the CPU 212 of the controller board 210. When receiving the print instruction, the CPU 212 instructs the CPU 222 of the engine control board 220 to execute image forming processing. The CPU 222 of the engine control board 220 controls the load or the like in the image forming apparatus 100 in accordance with this instruction to form an image onto the sheet S.

In a case where an abnormality occurs in the image forming apparatus 100, the CPU 222 of the engine control board 220 stores information related to the abnormality in a predetermined memory, and notifies the CPU 212 of the controller board 210 of the occurrence of the abnormality. When being notified of the occurrence of the abnormality, the CPU 212 of the controller board 210 gives a notification of the occurrence of the abnormality through the operation unit 1000 or the NW communication unit 213.

Figures 3, 4:
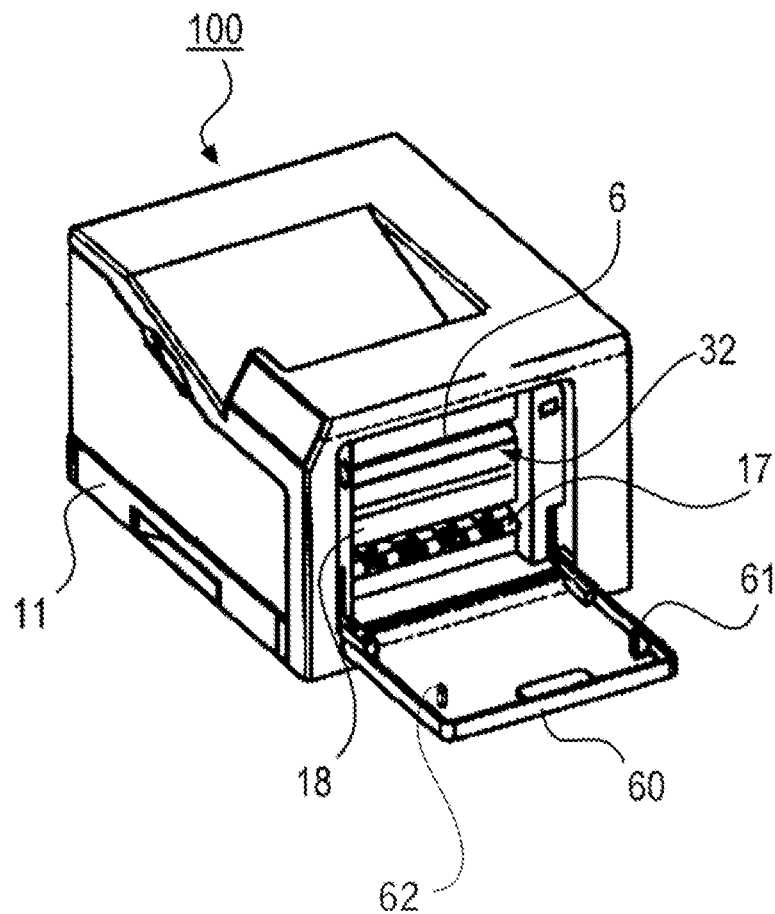
FIG. 3 is a perspective view for illustrating a state in which a right door of the image forming apparatus is opened.
FIG. 4 is an explanatory table for showing relationships among an open/closed state of the right door and states of a right door SW and an IL SW.

FIG. 3 is a perspective view for illustrating a state in which the right door 60 of the image forming apparatus 100 is opened. The image forming apparatus 100 has the right door 60 provided on the right side as viewed from the front side of the casing. The right door 60 is opened at the time of jam clearance work or replacement of the intermediate transfer belt unit 6 or other components. An opening 32 is formed through a right side surface of the casing of the image forming apparatus 100, and the opening 32 appears when the right door 60 is opened. In a case where the right door 60 is opened, the registration roller pair 17, the intermediate transfer belt unit 6, and the conveyance path 18 are exposed through the opening 32. In this manner, the user can remove the sheet S remaining in the apparatus through the opening 32.

The right door 60 includes protrusion portions 61 and 62.

The protrusion portion 61 presses the right door SW 2241 in a case where the right door 60 is closed, and separates away from the right door SW 2241 in a case where the right door 60 is opened. The right door SW 2241 is changed from a state of being pressed by the protrusion portion 61 to a state of separating away from the protrusion portion 61 to change a signal to be transmitted to the CPU 222. The CPU 222 can detect the open/closed state of the right door 60 based on this change of the signal.

The protrusion portion 62 presses the IL SW 2261 in a case where the right door 60 is closed, and separates away from the IL SW 2261 in a case where the right door 60 is opened. The IL SW 2261 is changed from a state of being pressed by the protrusion portion 62 to a state of separating away from the protrusion portion 62 to interrupt the supply of the +24V_IL voltage to the image forming unit 7, the secondary transfer roller 16, and the fixing device 14. In this manner, a large voltage is prevented from being supplied to the components of the image forming apparatus 100 in a case where the right door 60 is opened, thereby ensuring the safety of the user.

As described above, the supplying state of the +24V_IL voltage is changed in association with the opening/closing of the right door 60. In a case where the right door 60 is opened, the IL SW 2261 is brought into the state of separating from the protrusion portion 62 to stop outputting the +24V_IL voltage. In a case where the right door 60 is closed, the IL SW 2261 is brought into the state of being pressed by the protrusion portion 62 to output the +24V_IL voltage.

FIG. 4 is an explanatory table for showing relationships among the open/closed state of the right door 60 and states of the right door SW 2241 and the IL SW 2261. As described above, the states of the two switches (right door SW 2241 and IL SW 2261) are changed based on the opening/closing of the right door 60. In a case where the right door 60 is opened, the right door SW 2241 detects the open state of the right door 60, and the IL SW 2261 interrupts the supply of the +24V_IL voltage. In a case where the right door 60 is closed, the right door SW 2241 detects the closed state of the right door 60, and the IL SW 2261 supplies the +24V_IL voltage.

When both of the right door SW 2241 and the IL SW 2261 operate normally, the state of the right door 60 can be determined based on the state of the right door SW 2241 and the state of the IL SW 2261. The combination of the state of the right door SW 2241 and the state of the IL SW 2261 is as shown in FIG. 4. That is, when the combination of the state of the right door SW 2241 and the state of the IL SW 2261 differs from that shown in FIG. 4, at least one of the right door SW 2241 or the IL SW 2261 is failed.

Figure 5:
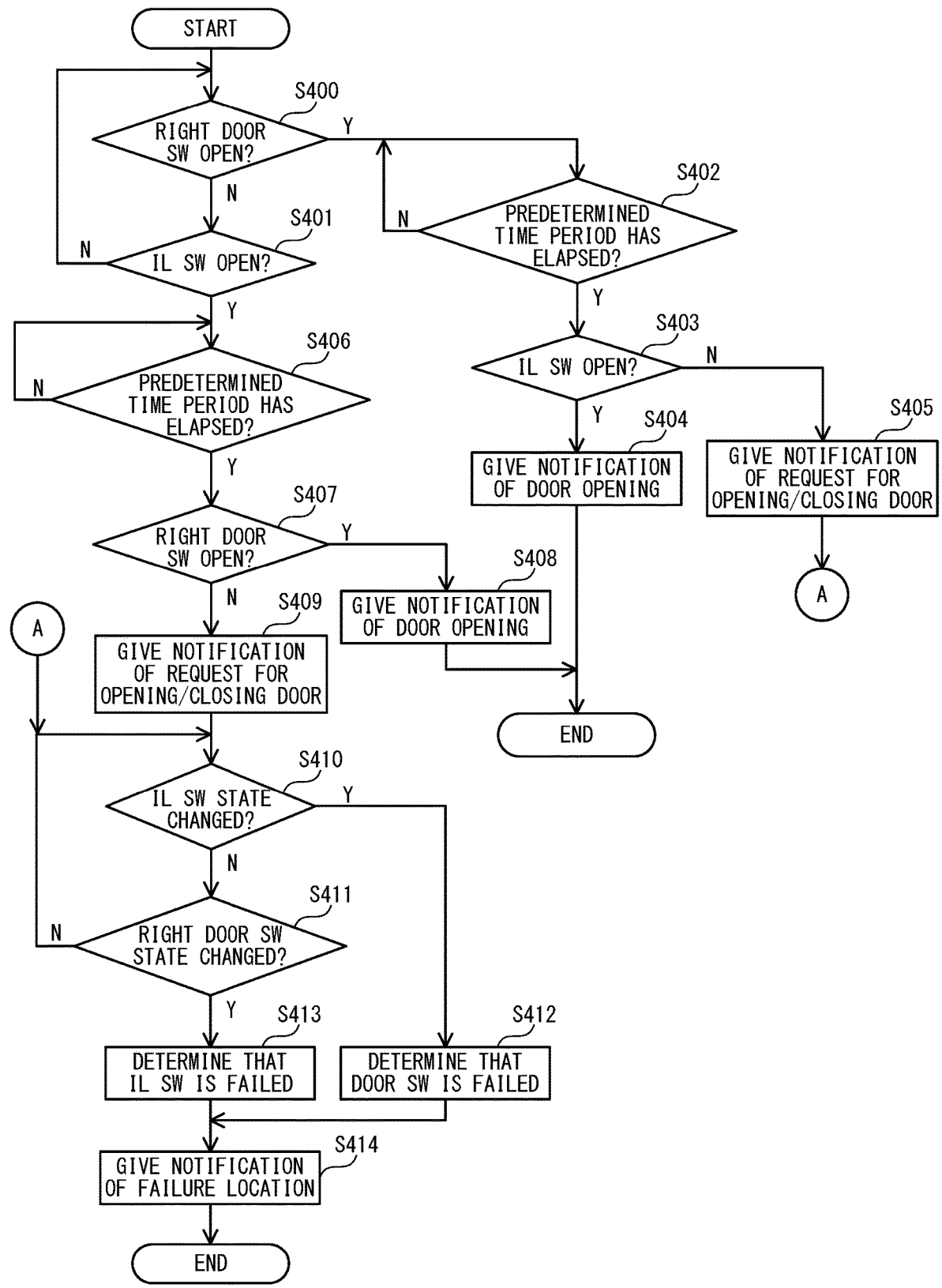
FIG. 5 is a flow chart for illustrating processing of determining the open/closed state of the right door and distinguishing a failed switch.

FIG. 5 is a flow chart for illustrating processing of determining the open/closed state of the right door 60 and distinguishing a failed switch. This processing is executed by the CPU 222 and the CPU 212. The CPU 222 can determine which of the right door SW 2241 and the IL SW 2261 is failed based on the detection result of the right door SW 2241 and the detection result of the supplying state of the +24V_IL voltage.

The CPU 222 monitors the open/closed state of the right door 60 and the supplying state of the +24V_IL voltage (Step S400 and Step S401). The CPU 222 monitors the open/closed state of the right door 60 based on the detection result of the right door SW 2241. The CPU 222 monitors the supplying state of the +24V_IL voltage based on the output of the IL SW 2261.

A description is given of a case in which, from a state in which the right door 60 is in the closed state and the +24V_IL voltage is output, the monitoring result of the right door 60 is changed to the open state (Step S400: Y). In this case, after a predetermined time period has elapsed (Step S402: Y), the CPU 222 determines whether or not the IL SW 2261 is in the open state to interrupt the +24V_IL voltage (Step S403). A slight time lag may be caused in the timing to detect the change in the state of each switch due to, for example, a difference in a mechanism for pressing the right door SW 2241 and the IL SW 2261. Therefore, the CPU 222 stands by for a predetermined time period in the process of Step S402. The predetermined time period for standby is, for example, 100 milliseconds.

In a case where the IL SW 2261 is in the open state and the supply of the +24V_IL voltage is thus interrupted (Step S403: Y), the CPU 222 determines that the right door 60 is opened. In this case, the right door SW 2241 also indicates the opening of the right door 60, and hence the CPU 222 causes the CPU 212 to give a notification indicating that the right door 60 is in the open state through use of the operation unit 1000, and ends the processing (Step S404).

In a case where the IL SW 2261 is in the closed state and the +24V_IL voltage is thus supplied (Step S403: N), there is an inconsistency between the detection result of the right door SW 2241 and the state of the IL SW 2261. Therefore, the CPU 222 determines that any one of the right door SW 2241 and the IL SW 2261 is failed. In this case, the CPU 222 causes the CPU 212 to output a request for urging the user to perform the opening/closing operation of the right door 60, through use of the operation unit 1000 (Step S405).

Processing performed after outputting the request for urging the user to perform the opening/closing operation is described later.

A description is given of a case in which, from the state in which the monitoring result of the right door 60 is the closed state and the +24V_IL voltage is output, the supplying state of the +24V_IL voltage is changed to the interrupting state (Step S400: N, and Step S401: Y). In this case, after a predetermined time period has elapsed (Step S406: Y), the CPU 222 determines whether or not the right door SW 2241 detects the open state (Step S407). The predetermined time period is equivalent in length to the predetermined time period of Step S402.

In a case where the right door SW 2241 detects the open state (Step S407: Y), the IL SW 2261 also indicates the opening of the right door 60, and hence the CPU 222 determines that the right door 60 is opened. In this case, the CPU 222 causes the CPU 212 to give a notification indicating that the right door 60 is in the open state through use of the operation unit 1000, and ends the processing (Step S408).

In a case where the right door SW 2241 detects the closed state (Step S407: N), there is an inconsistency between the detection result of the right door SW 2241 and the state of the IL SW 2261. Therefore, the CPU 222 determines that any one of the right door SW 2241 and the IL SW 2261 is failed. In this case, the CPU 222 causes the CPU 212 to display an indication for urging the user to perform the opening/closing operation of the right door 60, through use of the operation unit 1000 (Step S409).

After displaying the indication for urging the user to perform the opening/closing operation of the right door 60 in the process of Step S405 or the process of Step S409, the CPU 222 monitors changes of the states of the IL SW 2261 and the right door SW 2241 caused by the opening/closing operation of the right door 60 performed thereafter (Step S410 and Step S411). In a case where the state of the IL SW 2261 is changed (Step S410: Y), the CPU 222 determines that the IL SW 2261 operates normally but the right door SW 2241 is failed (Step S412).

In a case where the state of the right door 2241 is changed (Step S410: N, and Step S411: Y), the CPU 222 determines that the right door SW 2241 operates normally but the IL SW 2261 is failed (Step S413).

Figure 6:
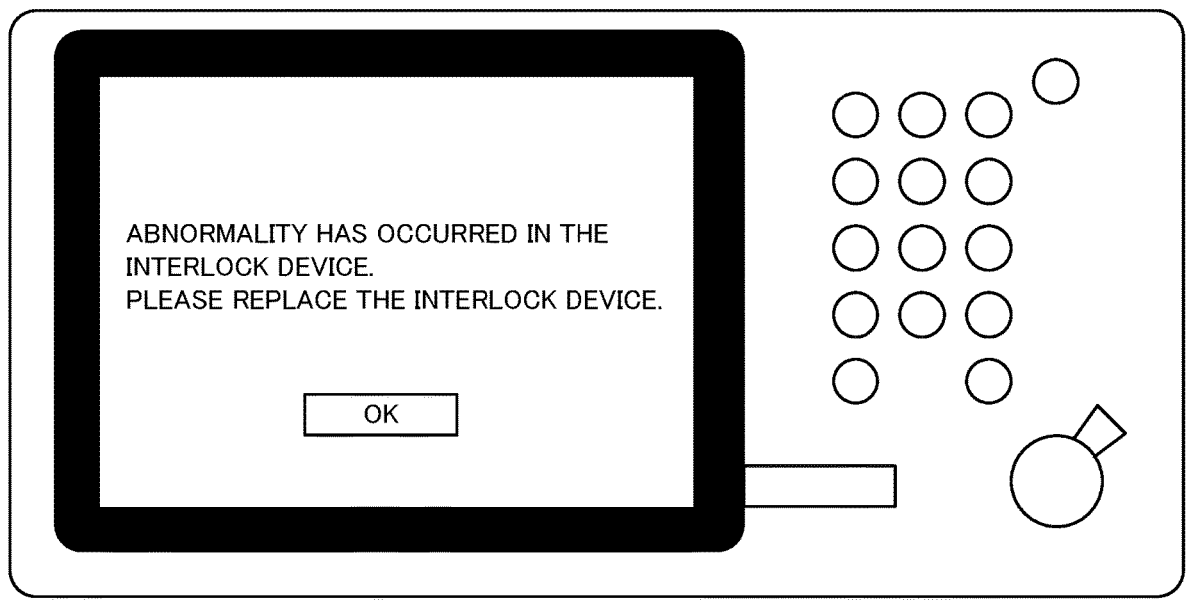
FIG. 6 is an exemplary view for illustrating a notification screen.

The CPU 222 notifies the CPU 212 of the failure location determined based on the process of any one of Steps S412 and S413. The CPU 212 gives a notification of the failure location through the operation unit 1000 in accordance with the notification from the CPU 222 (Step S414). FIG. 6 is an exemplary view for illustrating a notification screen for giving the notification of the failure location, which is to be displayed on the operation unit 1000. This notification screen exemplifies a case in which the IL SW 2261 is failed, and urges the user to replace the IL SW 2261. Further, the CPU 212 notifies a support center of the failure location through the NW communication unit 213 via the network. With the notification of the failure location, the processing of specifying the failure location is ended.

As described above, in the first embodiment, in a case where any one of the right door SW 2241 and the IL SW 2261 is failed, the failed switch can be specified. In this manner, the work time required for the serviceman to perform unit replacement can be reduced.

Second Embodiment

Figure 7:
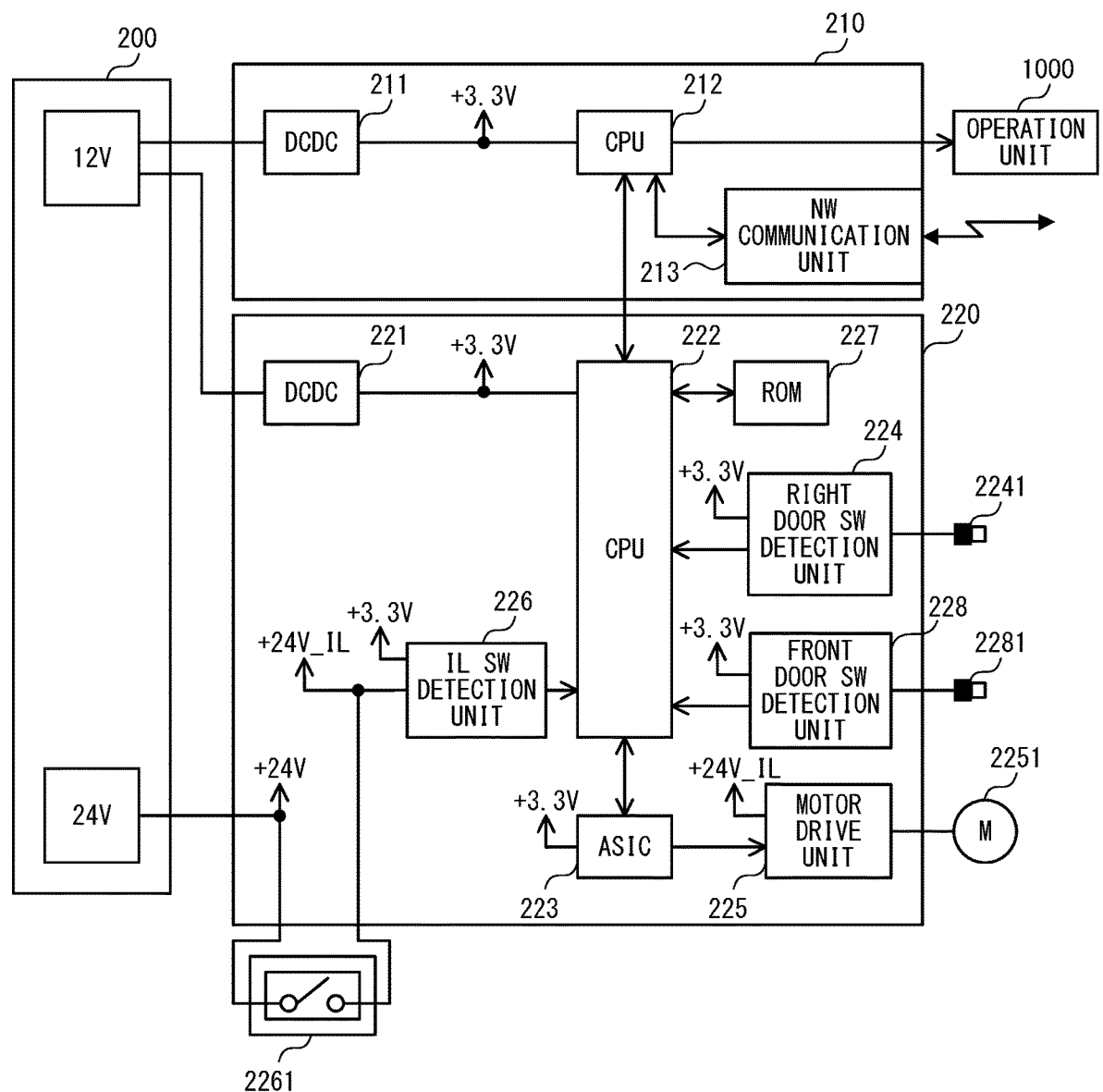
FIG. 7 is a configuration diagram for illustrating a control system in a second embodiment.
Figure 10:
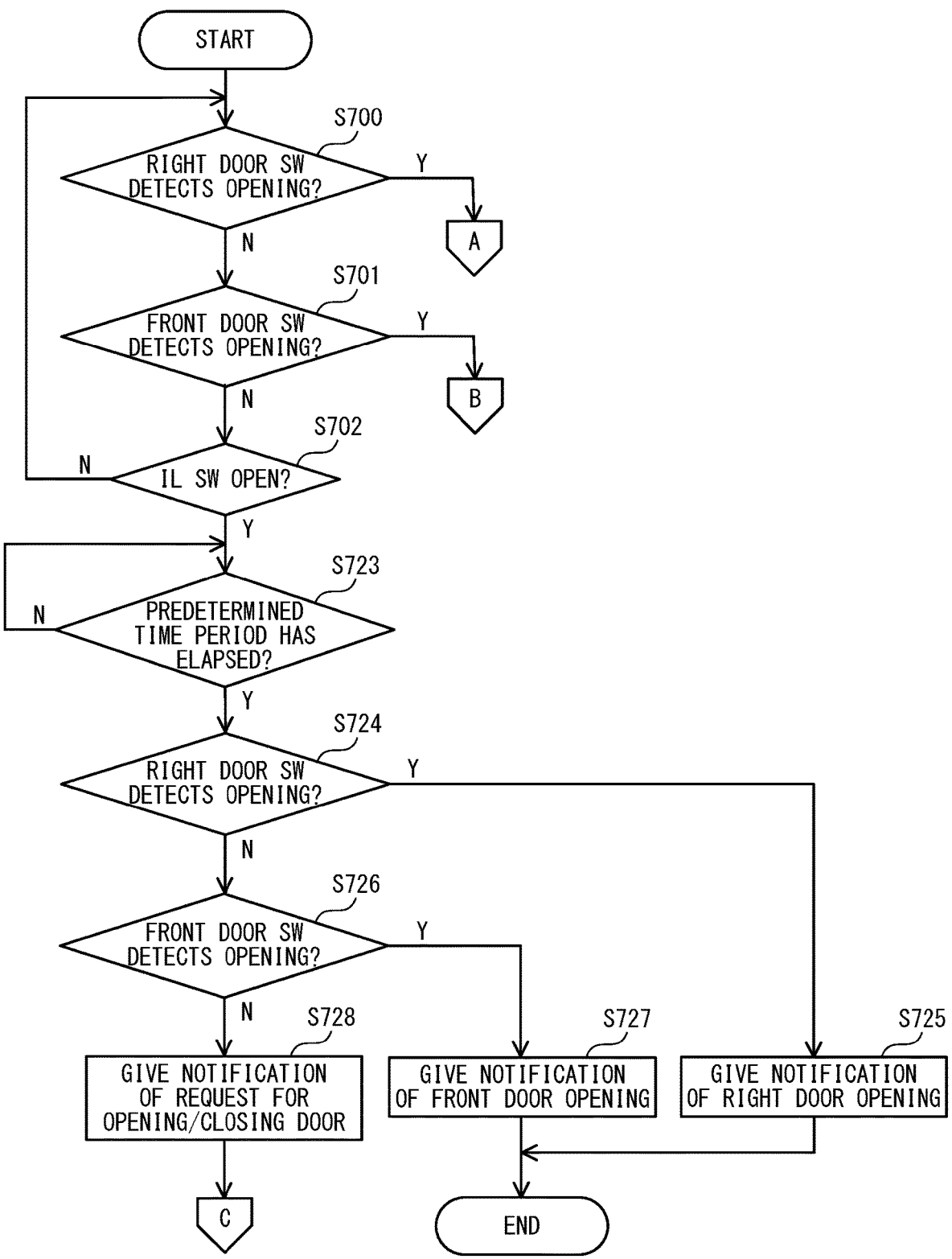
FIG. 10 is a flow chart for illustrating processing of determining the open/closed states of the right door and the front door and distinguishing a failed switch.

FIG. 7 is a configuration diagram for illustrating a control system in a second embodiment of the present disclosure, which is configured to control the operation of the image forming apparatus 100. This control system has a configuration in which a front door SW detection unit 228 is added to the engine control board 220 of the control system in the first embodiment illustrated in FIG. 2. The front door SW detection unit 228 is connected to a front door switch (SW) 2281 configured to detect an open/closed state of a front door 40 (see FIG. 8) provided to the casing of the image forming apparatus 100. Details of the front door 40 are described later.

The CPU 222 monitors the state of the front door SW 2281 via the front door SW detection unit 228. Details are described later, but the front door SW 2281 is a sensor to be pressed by a protrusion provided to the front door 40 in a case where the front door 40 is closed. In a case where the front door SW detection unit 228 detects that the front door SW 2281 is pressed, the front door SW detection unit 228 notifies the CPU 222 of the closed state of the front door 40. In a case where the front door 40 is opened, the front door SW 2281 is no longer pressed by the protrusion provided to the front door 40. Ina case where the front door SW detection unit 228 detects that the front door SW 2281 is no longer pressed, the front door SW detection unit 228 notifies the CPU 222 of the open state of the front door 40.

FIG. 8 is a perspective view for illustrating a state in which the front door 40 of the image forming apparatus 100 is opened. The image forming apparatus 100 has, in addition to the right door 60, the front door 40 provided on the front side of the casing. The front door 40 is opened at the time of replacement of the image forming units 7a, 7b, 7c, and 7d or other components. An opening 19 is formed through a front surface of the casing of the image forming apparatus 100, and the opening 19 appears when the front door 40 is opened. In a case where the front door 40 is opened, the image forming units 7a, 7b, 7c, and 7d and the like are exposed through the opening 19. In this manner, the user can mount and remove the image forming units 7a, 7b, 7c, and 7d and the like through the opening 19.

The front door 40 includes protrusion portions 41 and 42.

The protrusion portion 42 presses the front door SW 2281 in a case where the front door 40 is closed, and separates away from the front door SW 2281 in a case where the front door 40 is opened. The front door SW 2281 is changed from a state of being pressed by the protrusion portion 42 to a state of separating away from the protrusion portion 42 to change a signal to be transmitted to the CPU 222. The CPU 222 can detect the open state of the front door 40 based on this change of the signal.

The protrusion portion 41 presses the IL SW 2261 in a case where the front door 40 is closed, and separates away from the IL SW 2261 in a case where the front door 40 is opened. The IL SW 2261 is changed from a state of being pressed by the protrusion portion 41 to a state of separating away from the protrusion portion 41 to interrupt the supply of the +24V_IL voltage to the image forming unit 7, the secondary transfer roller 16, and the fixing device 14. In this manner, a large voltage is prevented from being supplied to the components of the image forming apparatus 100 in a case where the front door 40 is opened, thereby ensuring the safety of the user.

As described above, the supplying state of the +24V_IL voltage is changed in association with the opening/closing of the front door 40. In a case where the front door 40 is opened, the IL SW 2261 is brought into the state of separating from the protrusion portion 41 to stop outputting the +24V_IL voltage. In a case where the front door 40 is closed, the IL SW 2261 is brought into the state of being pressed by the protrusion portion 41 to output the +24V_IL voltage. As described with reference to FIG. 3, the state of the IL SW 2261 is changed even based on the opening/closing of the right door 60. Therefore, in the second embodiment, the state of the IL SW 2261 is changed in accordance with the opening/closing operation of the front door 40 or the right door 60.

FIG. 9 is an explanatory table for showing relationships among open/closed states of the right door 60 and the front door 40 and states of the right door SW 2241, the front door SW 2281, and the IL SW 2261. As described above, the states of the three switches (right door SW 2241, front door SW 2281, and IL SW 2261) are changed based on the opening/closing of the right door 60 and the front door 40. The state of the IL SW 2261 is changed in a case where any one of the right door 60 and the front door 40 is opened or closed.

In a case where the right door 60 is opened, the right door SW 2241 detects the open state of the right door 60. In a case where the front door 40 is opened, the front door SW 2281 detects the open state of the front door 40. The IL SW 2261 interrupts the supply of the +24V_IL voltage in a case where any one of the right door 60 and the front door 40 is opened. In a case where the right door 60 is closed, the right door SW 2241 detects the closed state of the right door 60. In a case where the front door 40 is closed, the front door SW 2281 detects the closed state of the front door 40. The IL SW 2261 supplies the +24V_IL voltage when both of the right door 60 and the front door 40 are closed.

When the right door SW 2241, the front door SW 2281, and the IL SW 2261 all operate normally, the combination of the state of the right door SW 2241, the state of the front door SW 2281, and the state of the IL SW 2261 is as shown in FIG. 9. That is, when the combination of the state of the right door SW 2241, the state of the front door SW 2281, and the state of the IL SW 2261 differs from that shown in FIG. 9, at least one of the right door SW 2241, the front door SW 2281, or the IL SW 2261 is failed.

FIG. 10 to FIG. 14 are flow charts for illustrating processing of determining the open/closed state of the right door 60 and the open/closed state of the front door 40, and distinguishing a failed switch. This processing is executed by the CPU 222 and the CPU 212. The CPU 222 can determine which of the right door SW 2241, the front door SW 2281, and the IL SW 2261 is failed based on the detection results of the right door SW 2241 and the front door SW 2281, and the detection result of the supplying state of the +24V_IL voltage.

The CPU 222 monitors the open/closed state of the right door 60, the open/closed state of the front door 40, and the supplying state of the +24V_IL voltage (Step S700, Step S701, and Step S702). The CPU 222 monitors the open/closed state of the right door 60 based on the detection result of the right door SW 2241. The CPU 222 monitors the open/closed state of the front door 40 based on the detection result of the front door SW 2281. The CPU 222 monitors the supplying state of the +24V_IL voltage based on the output of the IL SW 2261.

Figure 11:
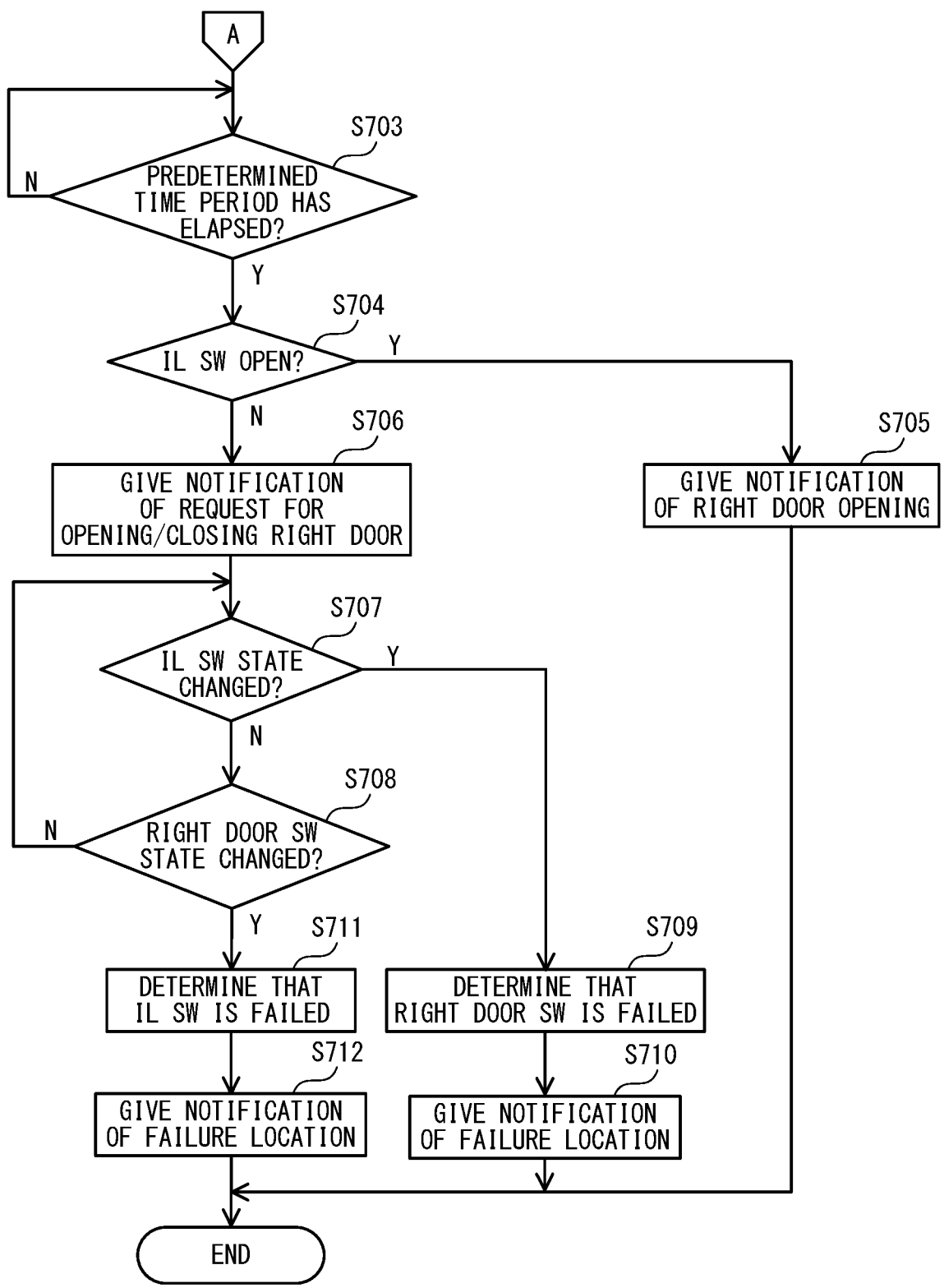
FIG. 11 is a flow chart for illustrating the processing of determining the open/closed states of the right door and the front door and distinguishing the failed switch.

A description is given of a case in which, from a state in which the right door 60 and the front door 40 are in the closed state and the +24V_IL voltage is output, the monitoring result of the right door 60 is changed to the open state (Step S700: Y). In this case, as illustrated in FIG. 11, after a predetermined time period has elapsed (Step S703: Y), the CPU 222 determines whether or not the IL SW 2261 is in the open state and the +24V_IL voltage is output (Step S704).

The predetermined time period is equivalent in length to the predetermined time period of Step S402 in the first embodiment.

In a case where the IL SW 2261 is in the open state and the supply of the +24V_IL voltage is thus interrupted (Step S704: Y), the CPU 222 determines that the right door 60 is opened. In this case, the right door SW 2241 also indicates the opening of the right door 60, and hence the CPU 222 causes the CPU 212 to give a notification indicating that the right door 60 is in the open state through use of the operation unit 1000, and ends the processing (Step S705).

In a case where the IL SW 2261 is in the closed state and the +24V_IL voltage is thus supplied (Step S704: N), there is an inconsistency between the detection result of the right door SW 2241 and the state of the IL SW 2261. Therefore, the CPU 222 determines that any one of the right door SW 2241 and the IL SW 2261 is failed. In this case, the CPU 222 causes the CPU 212 to output a request for urging the user to perform the opening/closing operation of the right door 60, through use of the operation unit 1000 (Step S706).

After outputting the request for urging the user to perform the opening/closing operation of the right door 60 via the CPU 212, the CPU 222 monitors the changes in the states of the IL SW 2261 and the right door SW 2241 caused by the opening/closing operation of the right door 60 performed thereafter (Step S707 and Step S708). In a case where the state of the IL SW 2261 is changed (Step S707: Y), the CPU 222 determines that the IL SW 2261 operates normally but the right door SW 2241 is failed (Step S709). The CPU 222 notifies the CPU 212 of the failure location. The CPU 212 gives a notification of the failure location through the operation unit 1000 in accordance with the notification from the CPU 222 (Step S710). The notification screen to be displayed on the operation unit 1000 is a screen for urging the user to replace the right door SW 2241 because the right door SW 2241 is failed. Further, the CPU 212 notifies the support center of the failure location through the NW communication unit 213 via the network. With the notification of the failure location, the processing of specifying the failure location is ended.

In a case where the state of the right door SW 2241 is changed (Step S707: N, and Step S708: Y), the CPU 222 determines that the right door SW 2241 operates normally but the IL SW 2261 is failed (Step S711). The CPU 222 notifies the CPU 212 of the failure location. The CPU 212 gives a notification of the failure location through the operation unit 1000 in accordance with the notification from the CPU 222 (Step S712). The notification screen to be displayed on the operation unit 1000 is the screen exemplified in FIG. 6, which urges the user to replace the IL SW 2261. Further, the CPU 212 notifies the support center of the failure location through the NW communication unit 213 via the network. With the notification of the failure location, the processing of specifying the failure location is ended.

Figure 12:
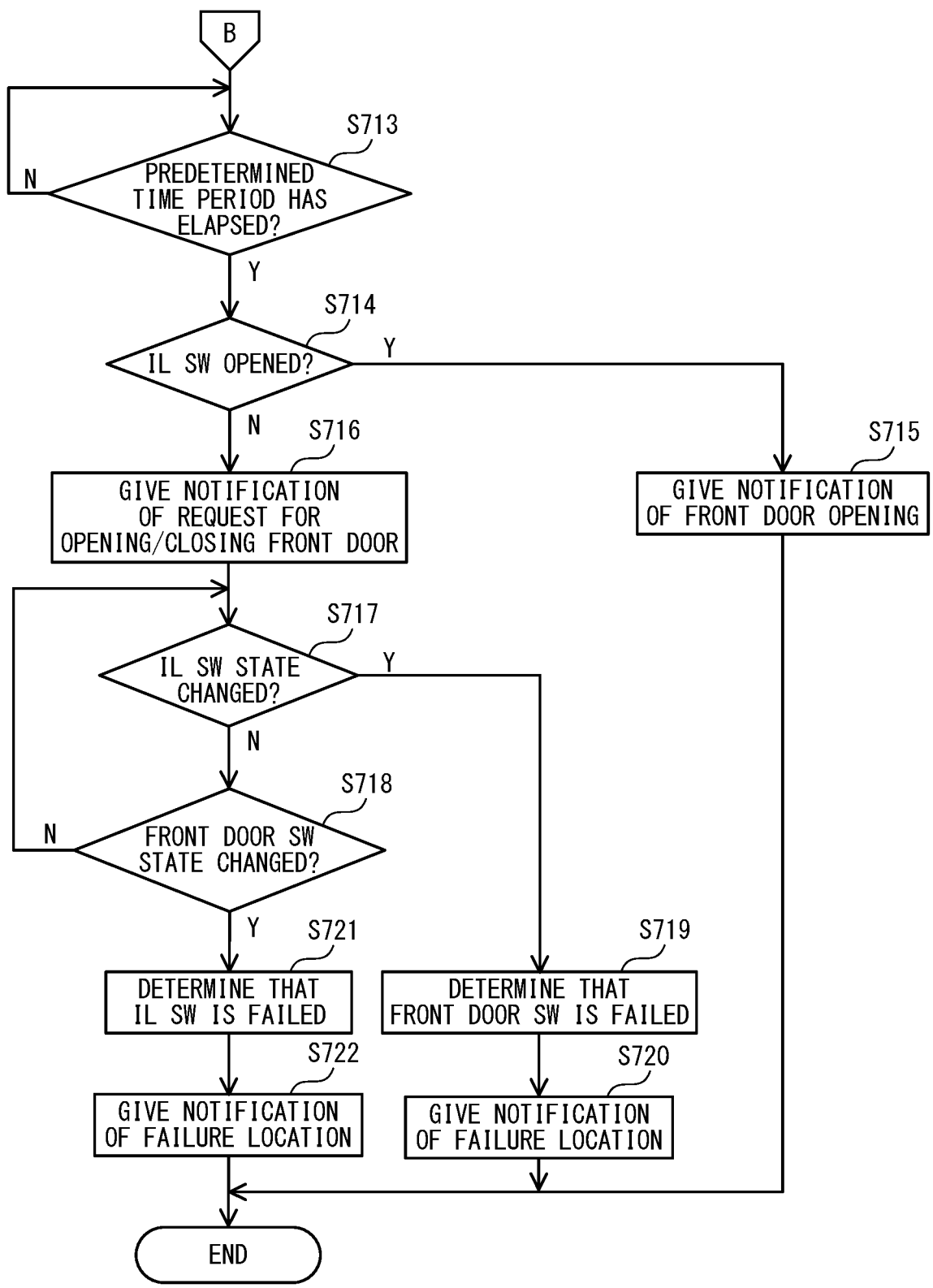
FIG. 12 is a flow chart for illustrating the processing of determining the open/closed states of the right door and the front door and distinguishing the failed switch.

A description is given of a case in which, from a state in which the right door 60 and the front door 40 are in the closed state and the +24V_IL voltage is output, the monitoring result of the front door 40 is changed to the open state (Step S700: N, and Step S701: Y). In this case, as illustrated in FIG. 12, after a predetermined time period has elapsed (Step S713: Y), the CPU 222 determines whether or not the IL SW 2261 is in the open state and the +24V_IL voltage is output (Step S714). The predetermined time period is equivalent in length to the predetermined time period of Step S402 in the first embodiment.

In a case where the IL SW 2261 is in the open state and the supply of the +24V_IL voltage is thus interrupted (Step S714: Y), the CPU 222 determines that the front door 40 is opened. In this case, the front door SW 2281 also indicates the opening of the front door 40, and hence the CPU 222 causes the CPU 212 to give a notification indicating that the front door 40 is in the open state through use of the operation unit 1000, and ends the processing (Step S715).

In a case where the IL SW 2261 is in the closed state and the +24V_IL voltage is thus supplied (Step S714: N), there is an inconsistency between the detection result of the front door SW 2281 and the state of the IL SW 2261. Therefore, the CPU 222 determines that any one of the front door SW 2281 and the IL SW 2261 is failed. In this case, the CPU 222 causes the CPU 212 to output a request for urging the user to perform the opening/closing operation of the front door 40, through use of the operation unit 1000 (Step S716).

After outputting the request for urging the user to perform the opening/closing operation of the front door 40 via the CPU 212, the CPU 222 monitors the changes in the states of the IL SW 2261 and the front door SW 2281 caused by the opening/closing operation of the front door 40 performed thereafter (Step S717 and Step S718). In a case where the state of the IL SW 2261 is changed (Step S717: Y), the CPU 222 determines that the IL SW 2261 operates normally but the front door SW 2281 is failed (Step S719). The CPU 222 notifies the CPU 212 of the failure location. The CPU 212 gives a notification of the failure location through the operation unit 1000 in accordance with the notification from the CPU 222 (Step S720). The notification screen to be displayed on the operation unit 1000 is a screen for urging the user to replace the front door SW 2281 because the front door SW 2281 is failed. Further, the CPU 212 notifies the support center of the failure location through the NW communication unit 213 via the network. With the notification of the failure location, the processing of specifying the failure location is ended.

In a case where the state of the front door SW 2281 is changed (Step S717: N, and Step S718: Y), the CPU 222 determines that the front door SW 2281 operates normally but the IL SW 2261 is failed (Step S721). The CPU 222 notifies the CPU 212 of the failure location. The CPU 212 gives a notification of the failure location through the operation unit 1000 in accordance with the notification from the CPU 222 (Step S722). The notification screen to be displayed on the operation unit 1000 is the screen exemplified in FIG. 6, which urges the user to replace the IL SW 2261. Further, the CPU 212 notifies the support center of the failure location through the NW communication unit 213 via the network. With the notification of the failure location, the processing of specifying the failure location is ended.

A description is given of a case in which, from the state in which the right door 60 and the front door 40 are in the closed state and the +24V_IL voltage is output, the supplying state of the +24V_IL voltage is changed to the interrupting state (Step S700: N, Step S701: N, and Step S702: Y). In this case, after a predetermined time period has elapsed (Step S723: Y), the CPU 222 determines whether or not the right door SW 2241 detects the open state (Step S724). The predetermined time period is equivalent in length to the predetermined time period of Step S402 in the first embodiment.

In a case where the right door SW 2241 detects the open state (Step S724: Y), the IL SW 2261 also indicates the opening of the right door 60, and hence the CPU 222 determines that the right door 60 is opened. In this case, the CPU 222 causes the CPU 212 to give a notification indicating that the right door 60 is in the open state through use of the operation unit 1000, and ends the processing (Step S725).

In a case where the right door SW 2241 detects the closed state (Step S724: N), the CPU 222 determines whether or not the front door SW 2281 detects the open state (Step S726). In a case where the front door SW 2281 detects the open state (Step S726: Y), the IL SW 2261 also indicates the opening of the front door 40, and hence the CPU 222 determines that the front door 40 is opened. In this case, the CPU 222 causes the CPU 212 to give a notification indicating that the front door 40 is in the open state through use of the operation unit 1000, and ends the processing (Step S727).

In a case where the front door SW 2281 detects the closed state (Step S726: N), there is an inconsistency among the detection result of the right door SW 2241, the detection result of the front door SW 2281, and the state of the IL SW 2261. Therefore, the CPU 222 determines that any one of the right door SW 2241, the front door SW 2281, and the IL SW 2261 is failed. In this case, the CPU 222 causes the CPU 212 to output a request for urging the user to perform the opening/closing operations of the right door 60 and the front door 40, through use of the operation unit 1000 (Step S728).

Figure 13:
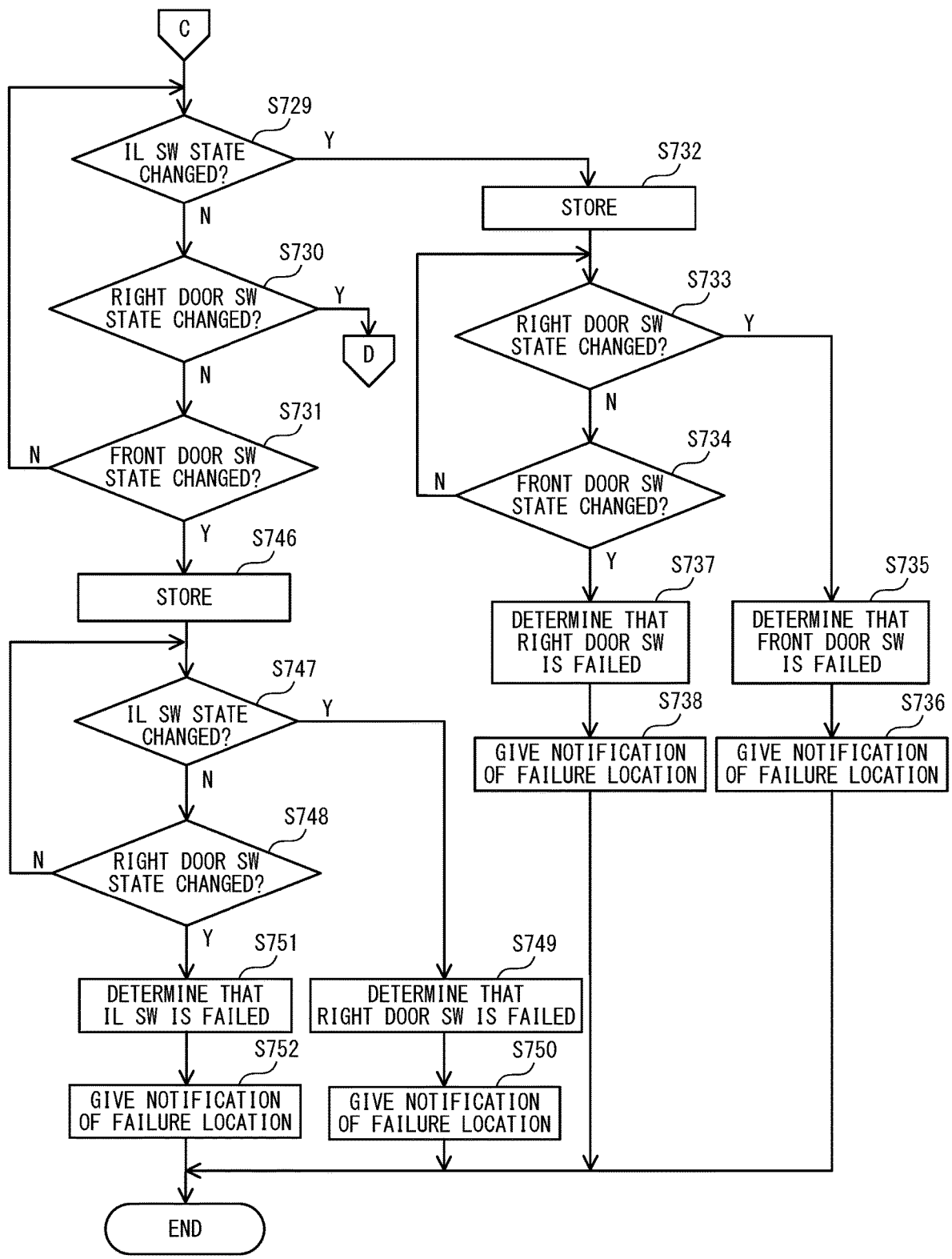
FIG. 13 is a flow chart for illustrating the processing of determining the open/closed states of the right door and the front door and distinguishing the failed switch.

After urging the user to perform the opening/closing operations of the right door 60 and the front door 40 via the CPU 212, the CPU 222 performs processing illustrated in FIG. 13. That is, the CPU 222 monitors the changes in the states of the IL SW 2261, the right door SW 2241, and the front door SW 2281 caused by the opening/closing operations of the right door 60 and the front door 40 (Step S729, Step S730, and Step S731). In a case where the state of the IL SW 2261 is changed and the interrupting state of the +24V_IL voltage is changed to the supplying state (Step S729: Y), the CPU 222 stores the fact that the IL SW 2261 operates normally (Step S732). The CPU 222 continuously monitors the changes in the states of the right door SW 2241 and the front door SW 2281 (Step S733 and Step S734).

In a case where the detection result of the right door SW 2241 is changed (Step S733: Y), the CPU 222 determines that the right door SW 2241 operates normally but the front door SW 2281 is failed (Step S735). The CPU 222 notifies the CPU 212 of the failure location. The CPU 212 gives a notification of the failure location through the operation unit 1000 in accordance with the notification from the CPU 222 (Step S736). The notification screen to be displayed on the operation unit 1000 is a screen for urging the user to replace the front door SW 2281. Further, the CPU 212 notifies the support center of the failure location through the NW communication unit 213 via the network. With the notification of the failure location, the processing of specifying the failure location is ended.

In a case where the detection result of the front door SW 2281 is changed (Step S733: N, and Step S734: Y), the CPU 222 determines that the front door SW 2281 operates normally but the right door SW 2241 is failed (Step S737). The CPU 222 notifies the CPU 212 of the failure location. The CPU 212 gives a notification of the failure location through the operation unit 1000 in accordance with the notification from the CPU 222 (Step S738). The notification screen to be displayed on the operation unit 1000 is a screen for urging the user to replace the right door SW 2241. Further, the CPU 212 notifies the support center of the failure location through the NW communication unit 213 via the network. With the notification of the failure location, the processing of specifying the failure location is ended.

Figure 14:
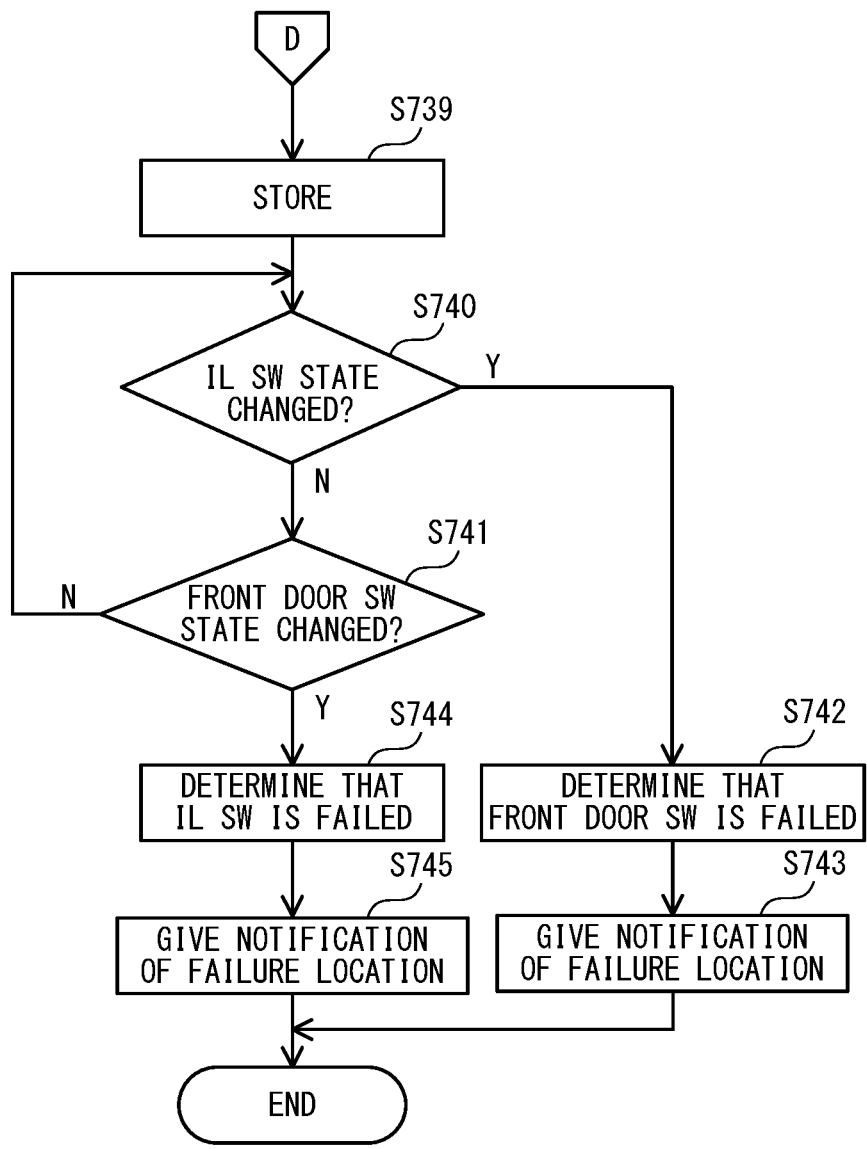
FIG. 14 is a flow chart for illustrating the processing of determining the open/closed states of the right door and the front door and distinguishing the failed switch.

In a case where the detection result of the right door SW 2241 is changed (Step S729: N, and Step S730: Y), as illustrated in FIG. 14, the CPU 222 stores the fact that the right door SW 2241 operates normally (Step S739). The CPU 222 continuously monitors the changes in the states of the IL SW 2261 and the front door SW 2281 (Step S740 and Step S741).

In a case where the state of the IL SW 2261 is changed (Step S740: Y), the CPU 222 determines that the IL SW 2261 operates normally but the front door SW 2281 is failed (Step S742). The CPU 222 notifies the CPU 212 of the failure location. The CPU 212 gives a notification of the failure location through the operation unit 1000 in accordance with the notification from the CPU 222 (Step S743). The notification screen to be displayed on the operation unit 1000 is a screen for urging the user to replace the front door SW 2281. Further, the CPU 212 notifies the support center of the failure location through the NW communication unit 213 via the network. With the notification of the failure location, the processing of specifying the failure location is ended.

In a case where the state of the front door SW 2281 is changed (Step S740: N, and Step S741: Y), the CPU 222 determines that the front door SW 2281 operates normally but the IL SW 2261 is failed (Step S744). The CPU 222 notifies the CPU 212 of the failure location. The CPU 212 gives a notification of the failure location through the operation unit 1000 in accordance with the notification from the CPU 222 (Step S745). The notification screen to be displayed on the operation unit 1000 is the screen exemplified in FIG. 6, which urges the user to replace the IL SW 2261. Further, the CPU 212 notifies the support center of the failure location through the NW communication unit 213 via the network. With the notification of the failure location, the processing of specifying the failure location is ended.

In a case where the detection result of the front door SW 2281 is changed (Step S729: N, Step S730: N, and Step S731: Y), the CPU 222 stores the fact that the front door SW 2281 operates normally (Step S746). The CPU 222 continuously monitors the changes in the states of the IL SW 2261 and the right door SW 2241 (Step S747 and Step S748).

In a case where the state of the IL SW 2261 is changed (Step S747: Y), the CPU 222 determines that the IL SW 2261 operates normally but the right door SW 2241 is failed (Step S749). The CPU 222 notifies the CPU 212 of the failure location. The CPU 212 gives a notification of the failure location through the operation unit 1000 in accordance with the notification from the CPU 222 (Step S750). The notification screen to be displayed on the operation unit 1000 is a screen for urging the user to replace the right door SW 2241. Further, the CPU 212 notifies the support center of the failure location through the NW communication unit 213 via the network. With the notification of the failure location, the processing of specifying the failure location is ended.

In a case where the state of the right door SW 2241 is changed (Step S747: N, and Step S748: Y), the CPU 222 determines that the right door SW 2241 operates normally but the IL SW 2261 is failed (Step S751). The CPU 222 notifies the CPU 212 of the failure location. The CPU 212 gives a notification of the failure location through the operation unit 1000 in accordance with the notification from the CPU 222 (Step S752). The notification screen to be displayed on the operation unit 1000 is the screen exemplified in FIG. 6, which urges the user to replace the IL SW 2261. Further, the CPU 212 notifies the support center of the failure location through the NW communication unit 213 via the network. With the notification of the failure location, the processing of specifying the failure location is ended.

As described above, in the second embodiment, in a case where any one of the right door SW 2241, the front door SW 2281, and the IL SW 2261 is failed, the failed switch can be specified. In this manner, the work time required for the serviceman to perform unit replacement can be reduced.

As described in the first and second embodiments, the image forming apparatus 100 detects the abnormality of any one of the IL SW 2261 and the opening/closing detection device (right door SW 2241, front door SW 2281) configured to detect opening/closing of one or more opening/closing members (right door 60, front door 40). In a case where the abnormality occurs, the image forming apparatus 100 can specify early the failure component causing the abnormality. Therefore, the work time required for the restoration from the occurrence of the abnormality of the image forming apparatus 100 can be shortened. As described above, according to the present disclosure, which of the interlock device and the opening/closing detection device is failed can be specified early.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-017897, filed Feb. 5, 2020, which is hereby incorporated by reference herein in its entirety.

What is claimed is:

1. An image forming apparatus comprising:
   an image forming unit configured to form an image;
   a transfer circuit configured to generate a transfer voltage, and supply the transfer voltage to transfer roller for transferring the image onto a sheet;
   a door provided to a mounting portion onto which the image forming unit is mounted;
   a sensor configured to detect an open/closed state of the door;
   an interlock switch configured to interrupt voltage to be supplied to the transfer circuit, in a case where the sensor detects an open state in which the door is opened; and
   a controller configured to:
     determine whether a failure has occurred or not based on a detection result of the sensor and a supplying/interrupting state of the voltage of the interlock switch; and
     determine, in a case where determining that the failure has occurred, which of the sensor and the interlock switch is failed based on a change in the detection result of the sensor and a change in a supplying state of the voltage of the interlock switch, which are caused by an opening/closing operation of the door performed after the occurrence of the failure is determined.

2. The image forming apparatus according to claim 1, wherein, in a case where the detection result of the sensor is changed due to the opening/closing operation of the door performed after the occurrence of the failure is determined, the contoller determines that the interlock switch is failed, and
   wherein, in a case where the supplying state of the voltage of the interlock switch is changed due to the opening/closing operation of the door performed after the occurrence of the failure is determined, the controller determines that the sensor is failed.

3. The image forming apparatus according to claim 1, wherein, in a case where the interlock switch is in a state of supplying the voltage and the sensor detects the open state and the interlock switch is not brought to a state of interrupting the voltage after a predetermined time period has elapsed, the controller notifies performing an opening/closing operation of the door as the opening/closing operation of the door performed after the occurrence of the failure is determined.

4. The image forming apparatus according to claim 1, wherein, in a case where the interlock switch is in a state of interrupting the voltage and the sensor detects a closed state of the door and the sensor does not detect the open state after a predetermined time period has elapsed, the controller notifies performing an opening/closing operation of the door as the opening/closing operation of the door performed after the occurrence of the failure is determined.

5. The image forming apparatus according to claim 1, wherein the door includes a first door and a second door, wherein the sensor includes:
     a first sensor configured to detect an open/closed state of the first door; and
     a second sensor configured to detect an open/closed state of the second door, and
   wherein, in a case where the first door and the second door are in a closed state, the interlock switch is brought into a state of supplying the voltage, and in a case where the first door is in an open state, the interlock switch is brought into a state of interrupting the voltage.

6. The image forming apparatus according to claim 5, wherein, in a case where the first sensor detects the open state of the first door and the interlock switch is in the state of supplying the voltage, the controller determines which of the first sensor and the interlock switch is failed based on a change in a detection result of the first sensor and a change in the supplying state of the voltage of the interlock switch, which are caused by an opening/closing operation of the first door performed as the opening/closing operation of the door after the occurrence of the failure is determined.

7. The image forming apparatus according to claim 6, wherein, in a case where the detection result of the first sensor is changed due to the opening/closing operation of the first door performed as the opening/closing operation of the door after the occurrence of the failure is determined, the controller determines that the interlock switch is failed, and
   wherein, in a case where the supplying state of the voltage of the interlock switch is changed due to the opening/closing operation of the first door, the controller determines that the first sensor is failed.

8. The image forming apparatus according to claim 1, wherein the controller is configured to give a notification of a component that is determined as being failed through a predetermined output interface.

* * * * *